(12) United States Patent
Lin et al.

(10) Patent No.: US 8,886,988 B2
(45) Date of Patent: Nov. 11, 2014

(54) METHOD OF CALIBRATING SIGNAL SKEWS IN MIPI AND RELATED TRANSMISSION SYSTEM

(75) Inventors: Ching-Chun Lin, New Taipei (TW);
Chih-Wei Tang, Penghu County (TW);
Hsueh-Yi Lee, Hsinchu County (TW);
Yu-Hsun Peng, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 480 days.

(21) Appl. No.: 13/231,972

(22) Filed: Sep. 14, 2011

(65) Prior Publication Data
US 2012/0294401 A1 Nov. 22, 2012

Related U.S. Application Data

(60) Provisional application No. 61/488,143, filed on May 19, 2011.

(30) Foreign Application Priority Data

Jun. 20, 2011 (TW) .............................. 100121456 A

(51) Int. Cl.
*G06F 1/10* (2006.01)
*H04L 7/033* (2006.01)
*H04L 7/00* (2006.01)

(52) U.S. Cl.
CPC ................ *H04L 7/0041* (2013.01); *G06F 1/10* (2013.01); *H04L 7/033* (2013.01); *H04L 7/0037* (2013.01)
USPC ........... 713/503; 713/401; 713/600; 375/362; 375/371; 370/516; 370/517

(58) Field of Classification Search
CPC ............. G06F 1/10; G06F 11/07; G11C 7/22; H04L 7/0033
USPC .......... 713/400, 401, 500, 503, 600; 375/362, 375/371; 370/516, 517
See application file for complete search history.

(56) References Cited

U.S. PATENT DOCUMENTS

| | | | | |
|---|---|---|---|---|
| 6,823,446 | B1 * | 11/2004 | Sinharoy | 712/239 |
| 7,024,326 | B2 * | 4/2006 | Nygren | 702/89 |
| 7,542,372 | B2 * | 6/2009 | Bae et al. | 365/233.1 |
| 8,073,090 | B2 * | 12/2011 | Zhang et al. | 375/362 |
| 2002/0122514 | A1 | 9/2002 | Hofmann | |
| 2006/0184817 | A1 | 8/2006 | Dreps | |
| 2010/0008460 | A1 | 1/2010 | Zhang | |

* cited by examiner

Primary Examiner — Thuan Du
(74) Attorney, Agent, or Firm — Winston Hsu; Scott Margo

(57) ABSTRACT

In calibration mode, a clock signal and a data signal are respectively transmitted via a clock lane and a data lane of an MIPI. A test clock signal is provided by adjusting the phase of the clock signal, and a test data signal is provided by adjusting the phase of the data signal. By latching the test data signal according to the test clock signal, a latched data may be acquired for determining an optimized phase relationship corresponding to the clock lane and the data lane. When transmitting the clock signal and the data signal in normal mode, the signal delays of the clock lane and the data lane may be adjusted according to the optimized phase relationship.

4 Claims, 15 Drawing Sheets

| skew adjusting stage | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|
| clock delay index | 0 | 1 | 2 | 3 | 4 | 5 | 6 | 7 | 8 | 9 | 10 | 11 | 12 | 13 | 14 | 15 |
| clock signal delay(Td) | 0 | 1 | 2 | 3 | 4 | 5 | 6 | 7 | 8 | 9 | 10 | 11 | 12 | 13 | 14 | 15 |
| data signal delay(Td) | 0 | | | | | | | | | | | | | | | |

| skew adjusting stage | S16 | S17 | S18 | S19 | S20 | S21 | S22 | S23 | S24 | S25 | S26 | S27 | S28 | S29 | S30 |
|---|---|---|---|---|---|---|---|---|---|---|---|---|---|---|---|
| clock delay index | -1 | -2 | -3 | -4 | -5 | -6 | -7 | -8 | -9 | -10 | -11 | -12 | -13 | -14 | -15 |
| clock signal delay(Td) | 0 | | | | | | | | | | | | | | |
| data signal delay(Td) | 1 | 2 | 3 | 4 | 5 | 6 | 7 | 8 | 9 | 10 | 11 | 12 | 13 | 14 | 15 |

FIG. 5

| skew adjusting stage | clock delay index | delay unit operation | latched data | expected data | comparing result R1 | latched data | expected data | comparing result R2 | comparing result R1&R2 |
|---|---|---|---|---|---|---|---|---|---|
| S30 | -15 | | DP15 10101010 | | X | DP15 10011001 | | X | X |
| S29 | -14 | | DP14 10101010 | | X | DP14 10011001 | | X | X |
| S28 | -13 | | DP13 10101010 | | X | DP13 10011001 | | X | X |
| S27 | -12 | | DP12 10101010 | | X | DP12 10011001 | | X | X |
| S26 | -11 | | DP11 10101010 | | X | DP11 10011001 | | X | X |
| S25 | -10 | | DP10 10101010 | | X | DP10 10011001 | | X | X |
| S24 | -9 | | DP9 10101010 | | X | DP9 10011001 | | X | X |
| S23 | -8 | CLK0' | DP8 10101010 | 01010101 (FIG.6A) | X | DP8 10011001 | 00110011 (FIG.6B) | X | X |
| S22 | -7 | | DP7 10101010 | | X | DP7 10011001 | | X | X |
| S21 | -6 | | DP6 01010101 | | O | DP6 00110011 | | O | O |
| S20 | -5 | | DP5 01010101 | | O | DP5 00110011 | | O | O |
| S19 | -4 | | DP4 01010101 | | O | DP4 00110011 | | O | O |
| S18 | -3 | | DP3 01010101 | | O | DP3 00110011 | | O | O |
| S17 | -2 | | DP2 01010101 | | O | DP2 00110011 | | O | O |
| S16 | -1 | | DP1 01010101 | | O | DP1 00110011 | | O | O |
| S0 | 0 | DT0' | DP0 01010101 | | O | DP0 00110011 | | O | O |
| S1 | 1 | CLK0" | DP0 01010101 | | O | DP0 00110011 | | O | O |
| S2 | 2 | CLK1" | DP1 01010101 | | O | DP1 00110011 | | O | O |
| S3 | 3 | CLK2" | DP2 01010101 | | O | DP2 00110011 | | O | O |
| S4 | 4 | CLK3" | DP3 01010101 | | O | DP3 00110011 | | O | O |
| S5 | 5 | CLK4" | DP4 10101010 | 01010101 (FIG.6C) | X | DP4 10011001 | 00110011 (FIG.6D) | X | X |
| S6 | 6 | CLK5" | DP5 10101010 | | X | DP5 10011001 | | X | X |
| S7 | 7 | CLK6" | DP6 10101010 | | X | DP6 10011001 | | X | X |
| S8 | 8 | CLK7" | DP7 10101010 | | X | DP7 10011001 | | X | X |
| S9 | 9 | CLK8" | DP8 10101010 | | X | DP8 10011001 | | X | X |
| S10 | 10 | CLK9" | DP9 10101010 | | X | DP9 10011001 | | X | X |
| S11 | 11 | CLK10" | DP10 10101010 | | X | DP10 10011001 | | X | X |
| S12 | 12 | CLK11" | DP11 10101010 | | X | DP11 10011001 | | X | X |
| S13 | 13 | CLK12" | DP12 10101010 | | X | DP12 10011001 | | X | X |
| S14 | 14 | CLK13" | DP13 10101010 | | X | DP13 10011001 | | X | X |
| S15 | 15 | CLK14" | DP14 01010101 | | O | DP14 10011001 | | X | X |
| | | CLK15" | DP15 01010101 | | O | DP15 10011001 | | X | X |

FIG. 7

| clock delay index | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|---|---|---|---|---|---|---|---|---|---|---|---|---|
| REG1 | 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 | 0 |
| REG2 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 |
| REG3 | 0 | 0 | 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 | 0 | 0 | 0 |
| REG4 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |

| clock delay index | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|---|---|---|---|---|---|---|---|---|---|---|---|---|
| REG1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| REG2 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| REG3 | 0 | 0 | 1 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 1 | 0 | 0 |
| REG4 | 0 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 0 |

METHOD OF CALIBRATING SIGNAL SKEWS IN MIPI AND RELATED TRANSMISSION SYSTEM

CROSS REFERENCE TO RELATED APPLICATIONS

This application claims the benefit of provisional application 61/488,143, filed May 19, 2011 and Taiwanese application 100121456, filed Jun. 20, 2011, and incorporated herein in its entirety by reference.

BACKGROUND OF THE INVENTION

1. Field of the Invention

The present invention is related to a method of calibrating signal skews and related transmission system, and more particular, to a method of calibrating signal skews in MIPI (mobile industry processor interface) and related transmission system.

2. Description of the Prior Art

With rapid development in technology, high-speed serial transmission technology had been used in electronic devices for providing larger data throughput. Such transmission technologies include MIPI (mobile industry processor interface), MDDI (mobile display digital interface), or USB (universal serial bus), etc. Among them, MIPI technology has been widely used in mobile devices including smart phones or PDAs (personal digital assistants) and can provide adjustable data rate using a differential clock lane and expandable (1~4) data lanes.

FIG. 1 is a diagram illustrating a prior art transmission system 10. The transmission system 10 adopts 4-channel MIPI and includes a host side circuit HS, transmission lanes 200~204, and a client side circuit CS. The host side circuit HS includes transmitting circuits 110~114 respectively configured to transmit a clock signal CLK and data signals DATA1~DATA4. The client side circuit CS includes receiving circuits 310~314 respectively configured to receive the clock signal CLK and the data signals DATA1~DATA4. The clock signal CLK and the data signals DATA1~DATA4 may be transmitted from the transmitting circuits 110~114 to the receiving circuits 310~314 via the transmission lanes 200~204, respectively.

FIGS. 2A~2D are signal diagrams illustrating the operation of the prior art transmission system 10. The waveforms of the clock signal CLK and the data signals DATA1~DATA4 are depicted. The client side circuit CS is configured to latch the data signals DATA1~DATA4 at the rising or falling edge of the clock signal CLK. A setup time $T_S$ is defined as the shortest time between the rising edges of the clock signal CLK and the data signals DATA1~DATA4, or between the falling edges of the clock signal CLK and the data signals DATA1~DATA4. A hold time $T_H$ is defined as the shortest time between the rising edge of the clock signal CLK and the falling edge of the data signals DATA1~DATA4, or between the falling edge of the clock signal CLK and the rising edge of the data signals DATA1~DATA4.

In the ideal situation, the clock signal CLK and the data signal DATA1 are balanced in phase ($T_S=T_H$), as depicted in FIG. 2A. However in real applications, signal skew may be present in MIDI due to unmatched length/loading of the transmission lanes 200~204, unmatched output of the transmitting circuits 110~114, unmatched loading of the receiving circuits 310~314, or discontinuous impedance between the host side circuit HS and the client side circuit CS. Therefore, the clock signal CLK and the data signals DATA1~DATA4 may not arrive at the client side circuit CS simultaneously. For example, the clock signal CLK may lead the data signal DATA2 in phase ($T_S<T_H$), as depicted in FIG. 2B; the clock signal CLK may lag the data signal DATA3 in phase ($T_S>T_H$), as depicted in FIG. 2C; the phase difference between the clock signal CLK and the data signal DATA4 may exceed a unit period UI ($T_S<0$), as depicted in FIG. 2D.

In real applications, MIPI normally includes a plurality of transmission lanes which may cause different amount of signal delays. As the operating frequency increases, the margin of error for signal skew (setup time $T_S$ and hold time $T_H$) become narrowed, thereby reducing data accuracy. Therefore, there is need for a method capable of calibrating signal skew in MIPI in order to maintain the accuracy of data transmission.

SUMMARY OF THE INVENTION

The present invention provides a method for calibrating signal skew in an MIPI. The method includes transmitting a clock signal via a clock lane of the MIPI and transmitting a first data signal via a data lane of the MIPI in a calibration mode; providing a test clock signal by adjusting a phase of the clock signal and providing a first test data signal by adjusting a phase of the first data signal; acquiring a first latched data by latching the first data signal according to the test clock signal; acquiring an optimized phase relationship between the clock lane and the data lane according to the first latched data; and adjusting a signal delay of the clock lane and a signal delay of the data lane according to the optimized phase relationship when transmitting the clock signal and the first data signal in a normal mode.

The present invention further provides a transmission system using an MIPI. The transmission system includes a host side circuit configured to transmit a clock signal via a first lane of the MIPI and transmit a data signal via a second lane of the MIPI; a client side circuit configured to adjust a signal delay of the first lane and a signal delay of the second lane according to an optimized phase relationship. The client side circuit includes a receiving circuit configured to receive the clock signal and the data signal; a calibration circuit configured to provide a test clock signal by adjusting a phase of the clock signal, provide a test data signal by adjusting a phase of the data signal, acquire a latched data by latching the test data signal according to the test clock signal, and acquire the optimized phase relationship according to the latched data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating the phase relationship between a clock signal and data signals in various delay conditions.

FIG. 7 is a summary table illustrating the results of FIGS. 6A~6D.

FIG. 8A is a diagram illustrating the operation of the calibration circuit in FIG. 3B.

FIG. 8B is a diagram illustrating the operation of the calibration circuit in FIG. 3B.

FIG. 9A is a diagram illustrating the operation of the calibration circuit in FIG. 3B.

FIG. 9B is a diagram illustrating the operation of the calibration circuit in FIG. 3B.

DETAILED DESCRIPTION

Figure 1:
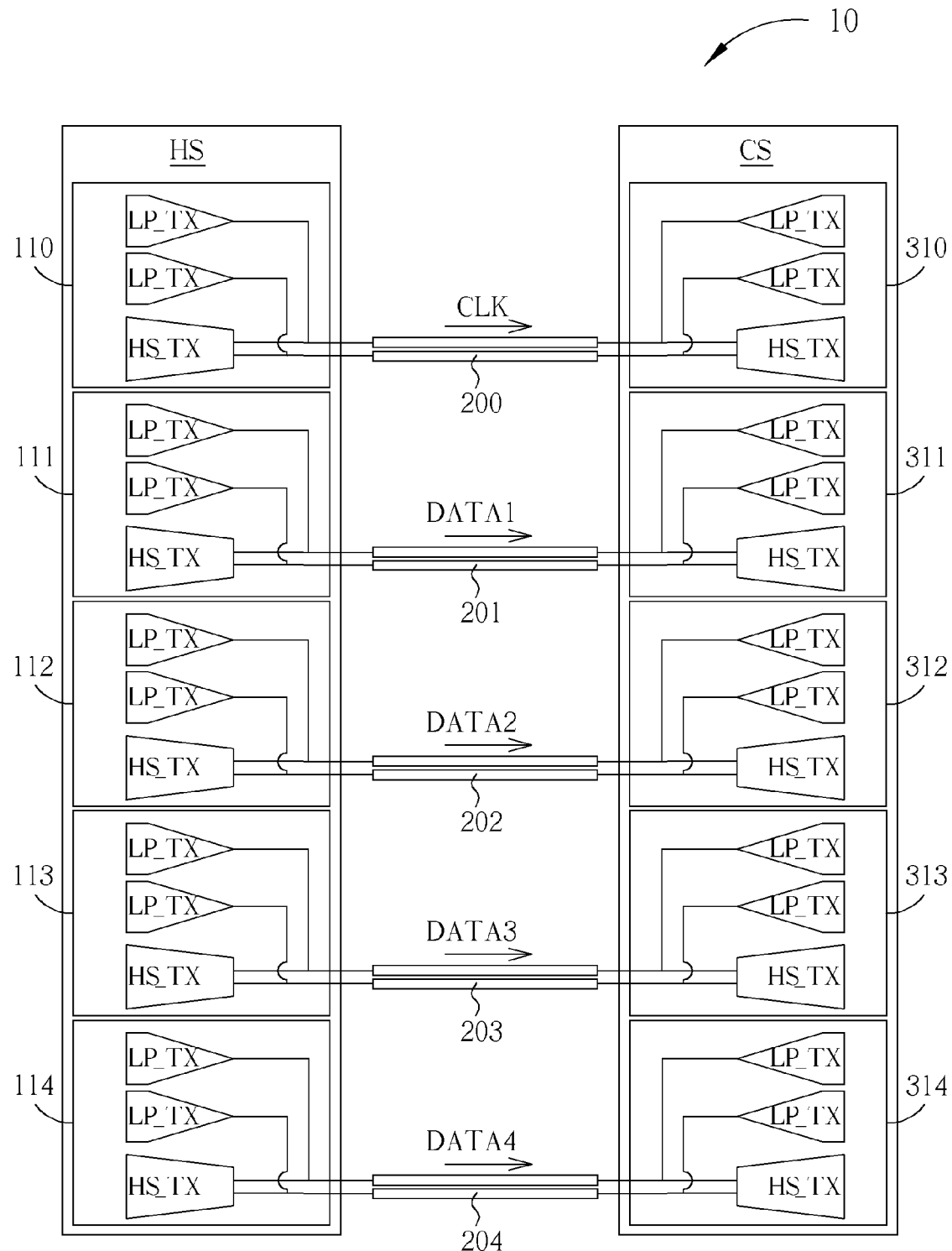
FIG. 1 is a diagram illustrating a prior art transmission system.
Figure 2A:
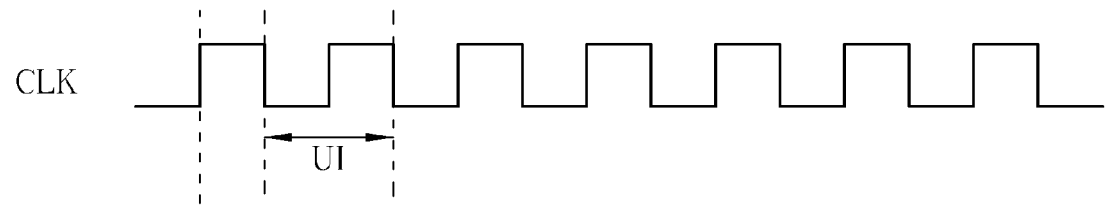
FIGS. 2A~2D are signal diagrams illustrating the operation of the prior art transmission system.
Figure 2B:
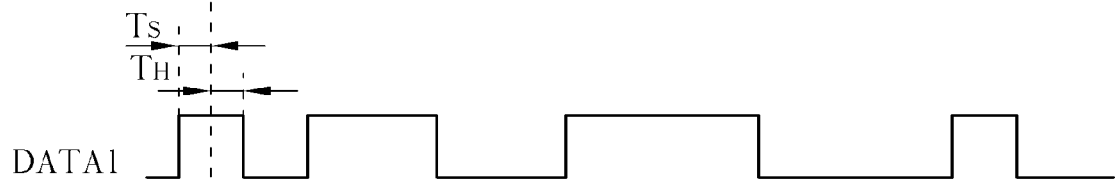
Figure 2C:
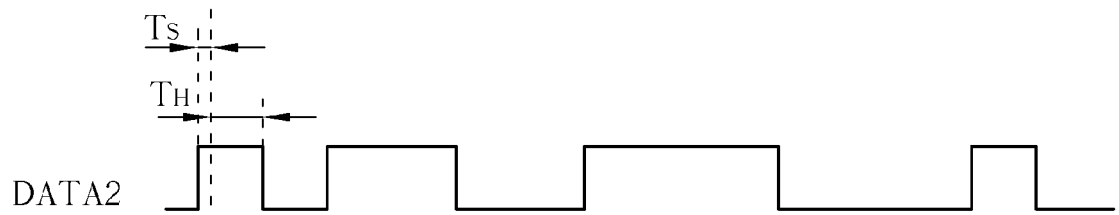
Figure 2D:
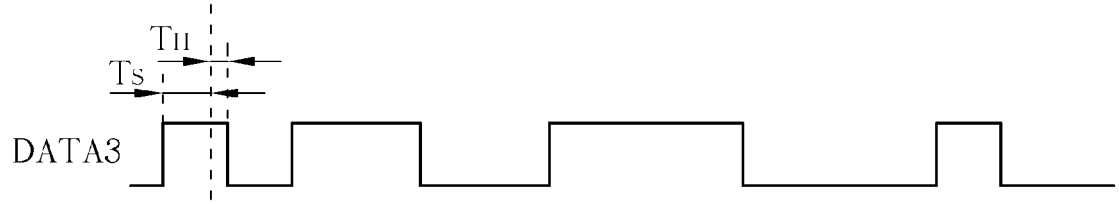
Figure 3A:
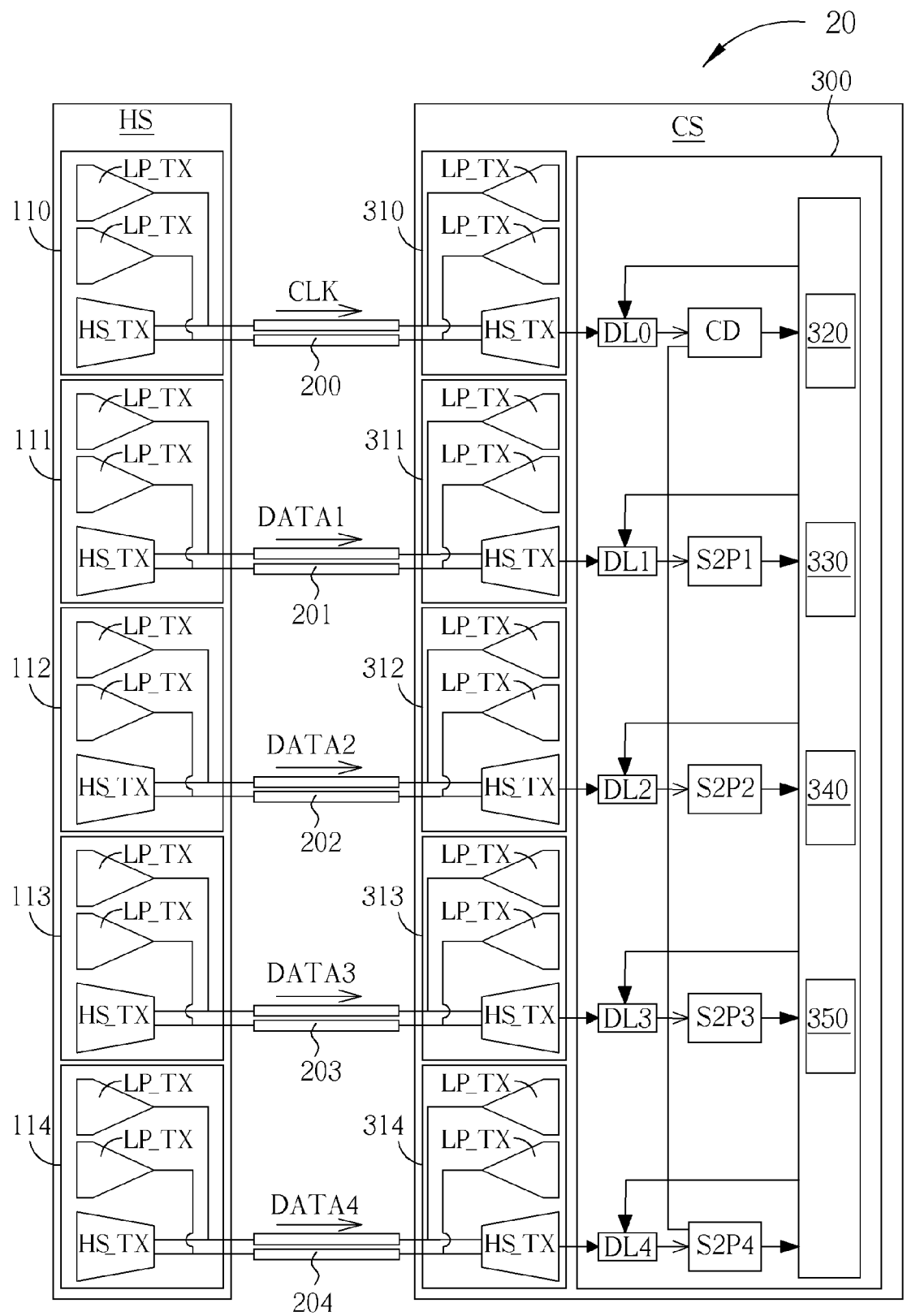
FIG. 3A is a diagram illustrating a transmission system according to an embodiment of the present application.

FIG. 3A is a diagram illustrating a transmission system 20 according to an embodiment of the present application. The transmission system 20 adopts 4-channel MIPI and includes a host side circuit HS, transmission lanes 200~204, and a client side circuit CS. The host side circuit HS includes transmitting circuits 110~114 respectively configured to transmit a clock signal CLK and data signals DATA1~DATA4. The client side circuit CS includes receiving circuits 310~314 and a calibration circuit 300. The receiving circuits 310~314 are configured to receive the clock signal CLK and the data signals DATA1~DATA4, respectively. The calibration circuit 300 is configured to adjust signal skew between the clock signal CLK and the data signals DATA1~DATA4. Each of the transmitting circuits 110~114 includes two low-power transmitters LP_TX and a high-speed receiver HS_TX, while each of the receiving circuits 310~314 includes two low-power receivers LP_RX and a high-speed receiver HS_RX. The low-power transmitters LP_TX and the low-power receivers LP_RX are configured to process low-power single-ended signals, while the high-speed transmitters HS_TX and the high-speed receivers HS_RX are configured to process high-speed differential signals. Therefore, the serial differential clock signal CLK and the data signals DATA1~DATA4 may be transmitted from the transmitting circuits 110~114 to the receiving circuits 310~314 via the transmission lanes 200~204, respectively.

Figure 3B:
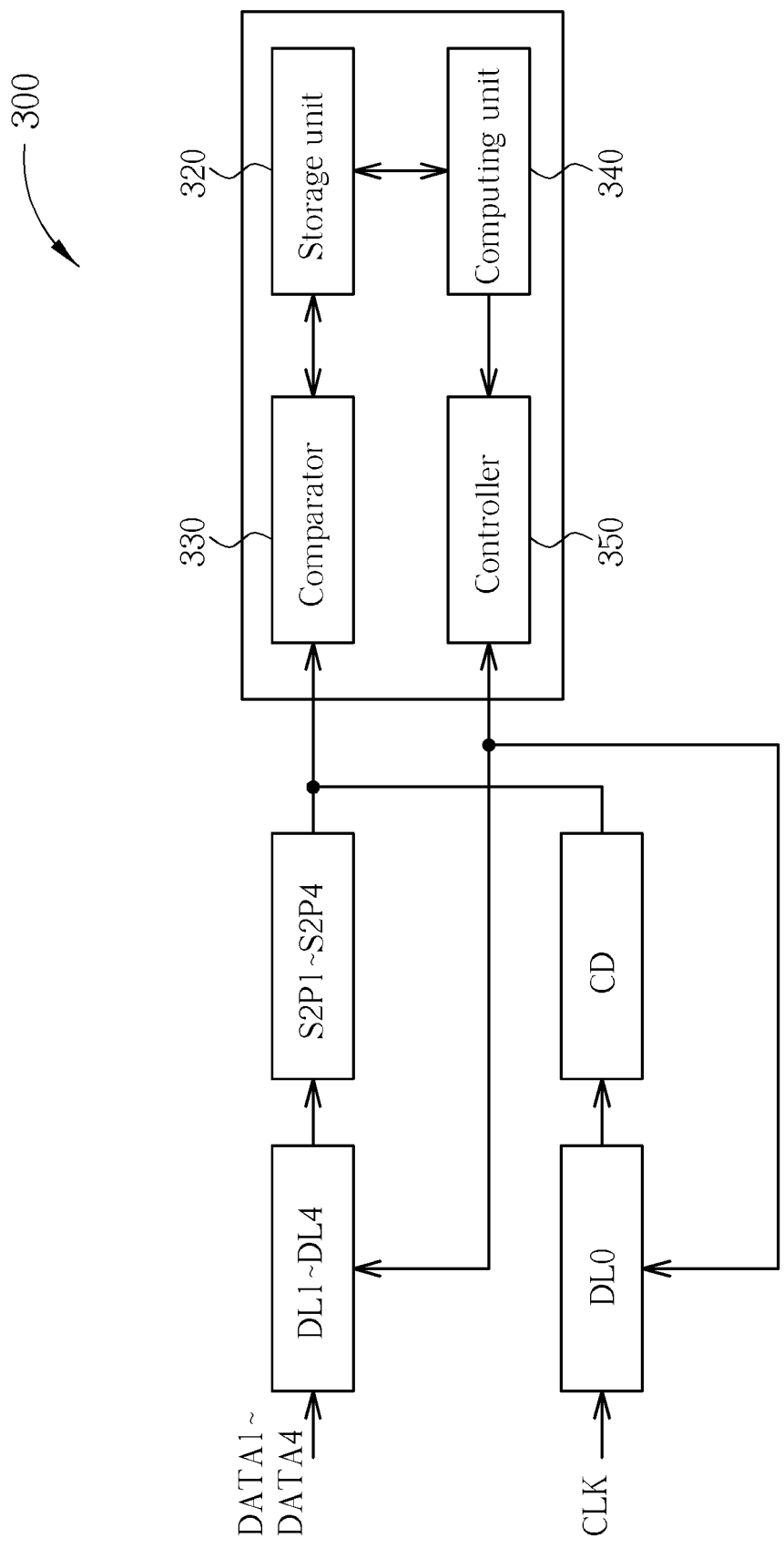
FIG. 3B is a functional diagram of a calibration circuit in the transmission system of FIG. 3A according to an embodiment of the present application.

FIG. 3B is a functional diagram of the calibration circuit 300 in the transmission system 20 according to an embodiment of the present application. The calibration circuit 300 includes delay units DL0~DL4, serial-to-parallel converters S2P1~S2P4, a frequency divider CD, a storage unit 320, a comparator 330, a computing unit 340, and a controller 350. By delaying the clock signal CLK and the data signals DATA1~DATA4, the calibration circuit 300 may acquire a data pass zone of each channel, thereby determining the optimized delay time of each channel.

Figure 4:
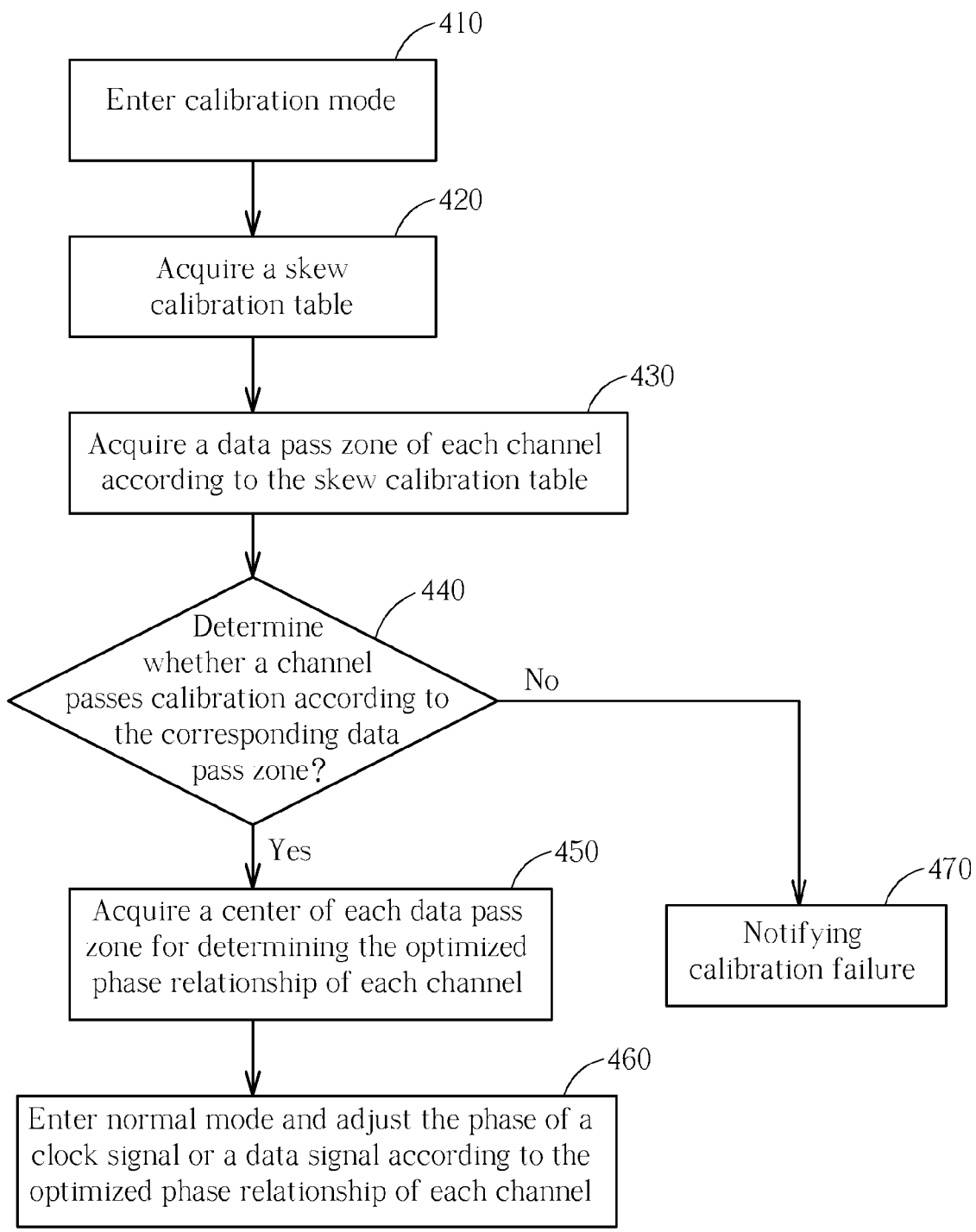
FIG. 4 is a flowchart illustrating the operation of the calibration circuit in FIG. 3B.

FIG. 4 is a flowchart illustrating the operation of the calibration circuit 300. The flowchart in FIG. 4 includes the following steps:

Step 410: enter calibration mode; execute step 420.

Step 420: acquire askew calibration table; execute step 430.

Step 430: acquire a data pass zone of each channel according to the skew calibration table; execute step 440.

Step 440: determine whether a channel passes calibration according to the corresponding data pass zone; if the channel passes calibration, execute step 450; if the channel fails calibration, execute step 470.

Step 450: acquire a center of each data pass zone for determining the optimized phase relationship of each channel; execute step 460.

Step 460: enter normal mode and adjust the phase of a clock signal or a data signal according to the optimized phase relationship of each channel.

Step 470: notifying calibration failure.

After entering calibration mode in step 410, the calibration circuit 300 is configured to delay the clock signal CLK and the data signals DATA1~DATA4 to different degrees. FIG. 5 is a diagram illustrating the phase relationship between the clock signal CLK and the data signals DATA1~DATA4 in various delay conditions. In this embodiment, the delay units DL0~DL4 may provide 31 skew adjusting stages S0~S30: in the skew adjusting stage S0, the clock signal CLK and the data signals DATA1~DATA4 are delayed by 0 Td (Td is a unit of time); in the skew adjusting stage S1~S15, the clock signal CLK is delayed respectively by 1~15 Td, while the data signals DATA1~DATA4 are delayed by 0 Td; in the skew adjusting stage S16~S30, the clock signal CLK is delayed by 0 Td, while each of the data signals DATA1~DATA4 is delayed respectively by 1~15 Td. Each skew adjusting stage corresponds to a specific clock delay index which is an integer between −15 and 15.

Figure 6A:
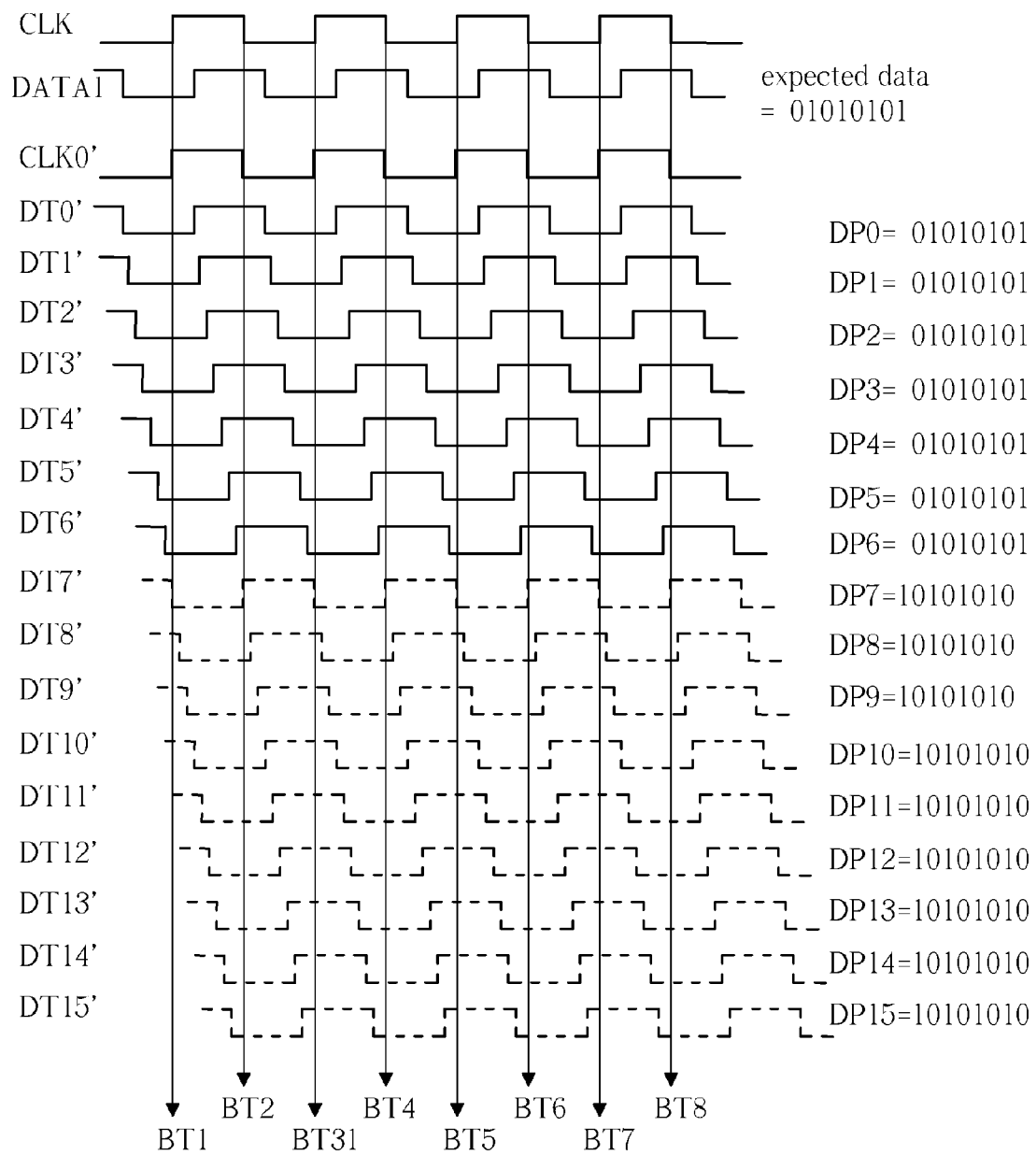
FIGS. 6A~6D are signal diagrams illustrating various delay conditions.
Figure 6B:
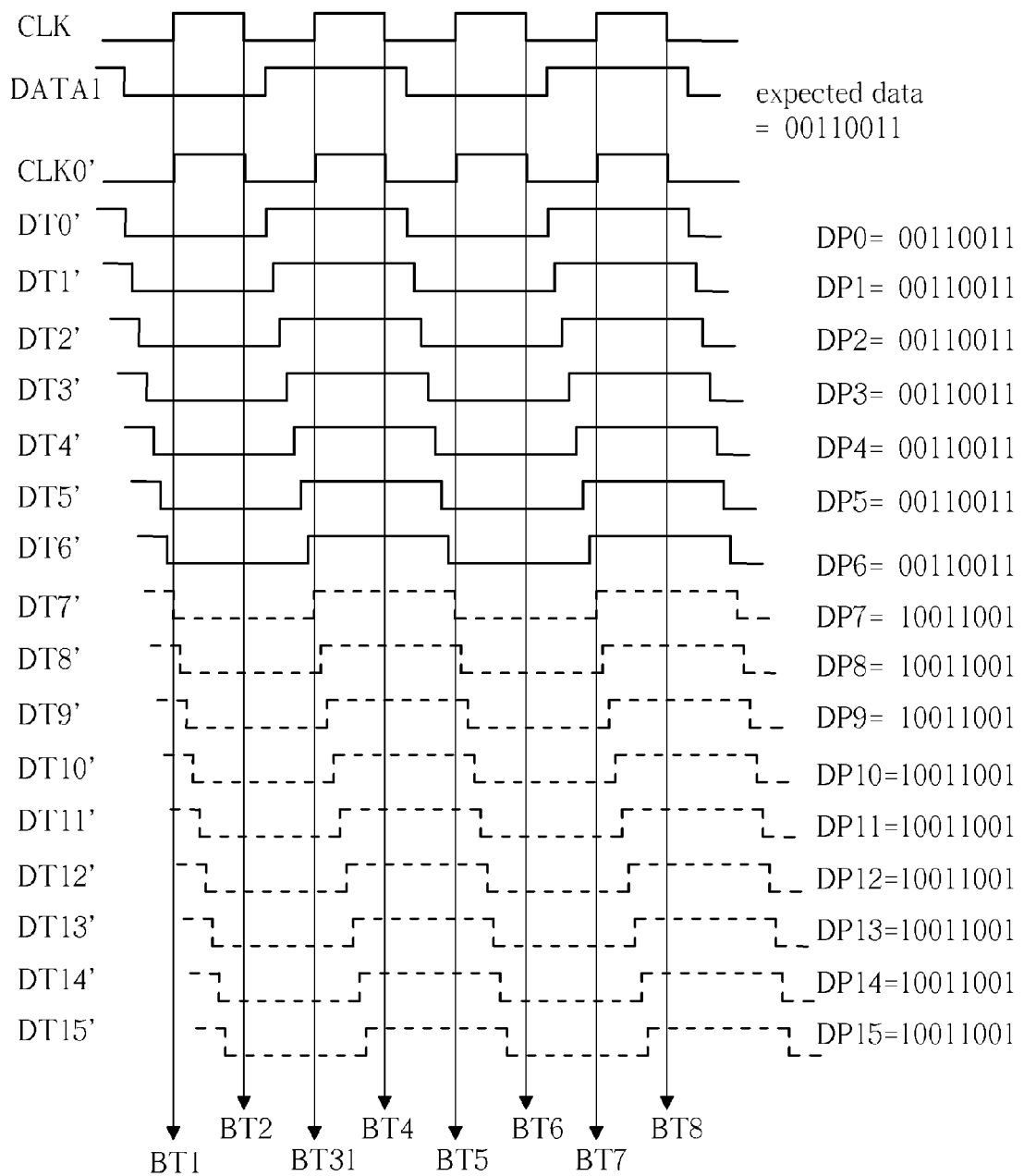
Figure 6C:
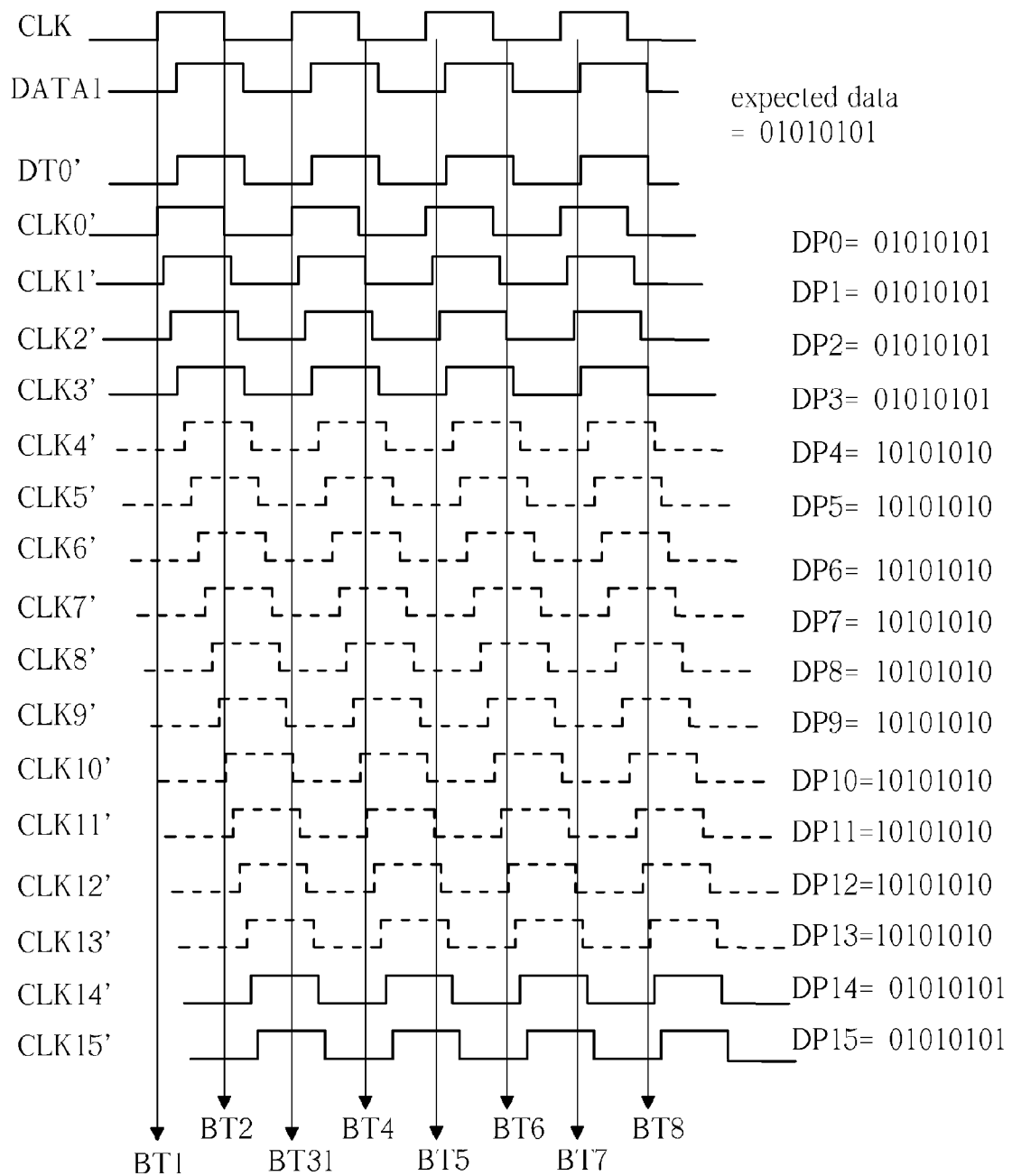
Figure 6D:
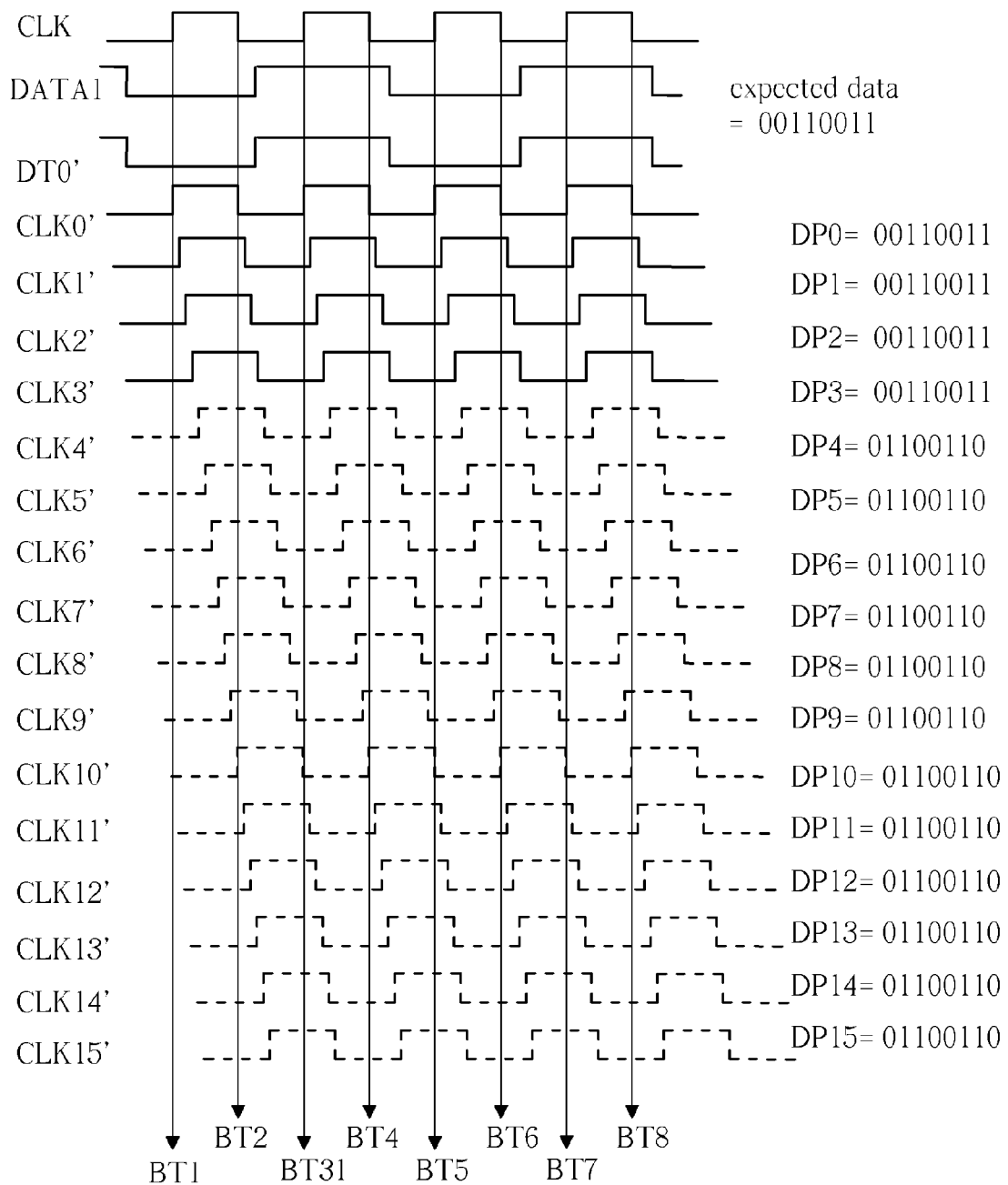

FIGS. 6A~6D are signal diagrams illustrating various delay conditions. For ease of explanation, only the clock signal CLK and the data signal DATA1 are depicted. FIGS. 6A and 6B are signal diagrams illustrating the skew adjusting stages S0~S15, while FIGS. 6C and 6D are signal diagrams illustrating the skew adjusting stages S0, S16~S30.

In the embodiment illustrated in FIG. 6A, the clock signal CLK is transmitted from the transmitting circuit 110 of the host side circuit HS to the receiving circuit 310 of the client side circuit CS, and the data signal DATA1 of "01010101" is transmitted from the transmitting circuit 111 of the host side circuit HS to the receiving circuit 311 of the client side circuit CS. Next, the delay unit DL0 is configured to delay the clock signal CLK by 0 Td, while the delay unit DL1 is configured to delay the data signal DATA1 respectively by 0~15 Td, thereby providing a test clock signal CLK0' and 16 test data signals DT0'~DT15'. By latching the test data signals DT0'~DT15' at the rising/falling edge of the test clock signal CLK0', the client side circuit CS may acquire 8 serial bits BT1~BT8, which are then integrated as parallel data DP0~DP15 by the serial-to-parallel converter S2P1.

In the embodiment illustrated in FIG. 6B, the clock signal CLK is transmitted from the transmitting circuit 110 of the host side circuit HS to the receiving circuit 310 of the client side circuit CS, and the data signal DATA1 of "00110011" is transmitted from the transmitting circuit 111 of the host side circuit HS to the receiving circuit 311 of the client side circuit CS. Next, the delay unit DL0 is configured to delay the clock signal CLK by 0 Td, while the delay unit DL1 is configured to delay the data signal DATA1 respectively by 0~15 Td, thereby providing a test clock signal CLK0' and 16 test data signals DT0'~DT15'. By latching the test data signals DT0'~DT15' at the rising/falling edge of the test clock signal CLK0', the client side circuit CS may acquire 8 serial bits BT1~BT8, which are then integrated as parallel data DP0~DP15 by the serial-to-parallel converter S2P1.

In the embodiment illustrated in FIG. 6C, the clock signal CLK is transmitted from the transmitting circuit 110 of the host side circuit HS to the receiving circuit 310 of the client side circuit CS, and the data signal DATA1 of "01010101" is transmitted from the transmitting circuit 111 of the host side circuit HS to the receiving circuit 311 of the client side circuit CS. Next, the delay unit DL0 is configured to delay the clock signal CLK respectively by 0~15 Td, while the delay unit DL1 is configured to delay the data signal DATA1 by 0 Td, thereby providing 16 test clock signals CLK0'~CLK15' and a test data signals DT0'. By latching the test data signal DT0' at the rising/falling edges of the test clock signals CLK0'~CLK15', the client side circuit CS may acquire 8 serial bits BT1~BT8, which are then integrated as parallel data DP0~DP15 by the serial-to-parallel converter S2P1.

In the embodiment illustrated in FIG. 6D, the clock signal CLK is transmitted from the transmitting circuit 110 of the host side circuit HS to the receiving circuit 310 of the client side circuit CS, and the data signal DATA1 of "00110011" is transmitted from the transmitting circuit 111 of the host side circuit HS to the receiving circuit 311 of the client side circuit CS. Next, the delay unit DL0 is configured to delay the clock signal CLK respectively by 0~15 Td, while the delay unit DL1 is configured to delay the data signal DATA1 by 0 Td, thereby providing 16 test clock signals CLK0'~CLK15' and a test data signals DT0'. By latching the test data signal DT0' at the rising/falling edges of the test clock signals CLK0'~CLK15', the client side circuit CS may acquire 8 serial bits BT1~BT8, which are then integrated as parallel data DP0~DP15 by the serial-to-parallel converter S2P1.

FIG. 7 is a summary table illustrating the results of FIGS. 6A~6D. The comparator 330 is configured to compare each latched data with its corresponding expected data, thereby generating comparing results associated with each skew adjusting stage and the value of the data signal. As the comparing result R1 shows, after being processed in the skew adjusting stages S0~S30, the data signal DATA1 of "01010101" may include two data pass zones, respectively indicated by the clock delay indexes −6~3 and 14~15. As the comparing result R2 shows, after being processed in the skew adjusting stages S0~S30, the data signal DATA1 of "00110011" may include a single data pass zone, indicated by the clock delay indexes −6~3. Multiple data pass zones may complicate the process of acquiring the optimized phase relationship. Therefore, the present comparator 330 may perform a specific logic operation on the comparing results R1 and R2. For example, after performing AND operation on the comparing results (R1&R2), each expected data only includes a single data pass zone. For each skew adjusting stage, the present invention may determine the optimized phase relationship according to the result of a specific data signal (R1 or R2), or according to the results of multiple specific data signals (R1 and R2) simultaneously.

FIGS. 8A~8D and 9A~9D are diagrams illustrating the operation of the calibration circuit 300 when executing steps 420~470. The data signal DATA1 is used for explaining the embodiments in FIGS. 6A~6D and 7. Similarly, the data signals DATA2~DATA4 may also be processed in the skew adjusting stages S0~S30, thereby acquiring a skew calibration table in step 420. The skew calibration table may be stored in the storage unit 320.

FIGS. 8A and 9A are diagrams illustrating the skew calibration table in two cases. REG1~REG4 represent the 32-bit registers of the storage unit 32 for storing the calibration results of the transmission lanes 201~204, respectively. "1" represents data pass zone, while "0" represents data fail zone.

Figure 8B:
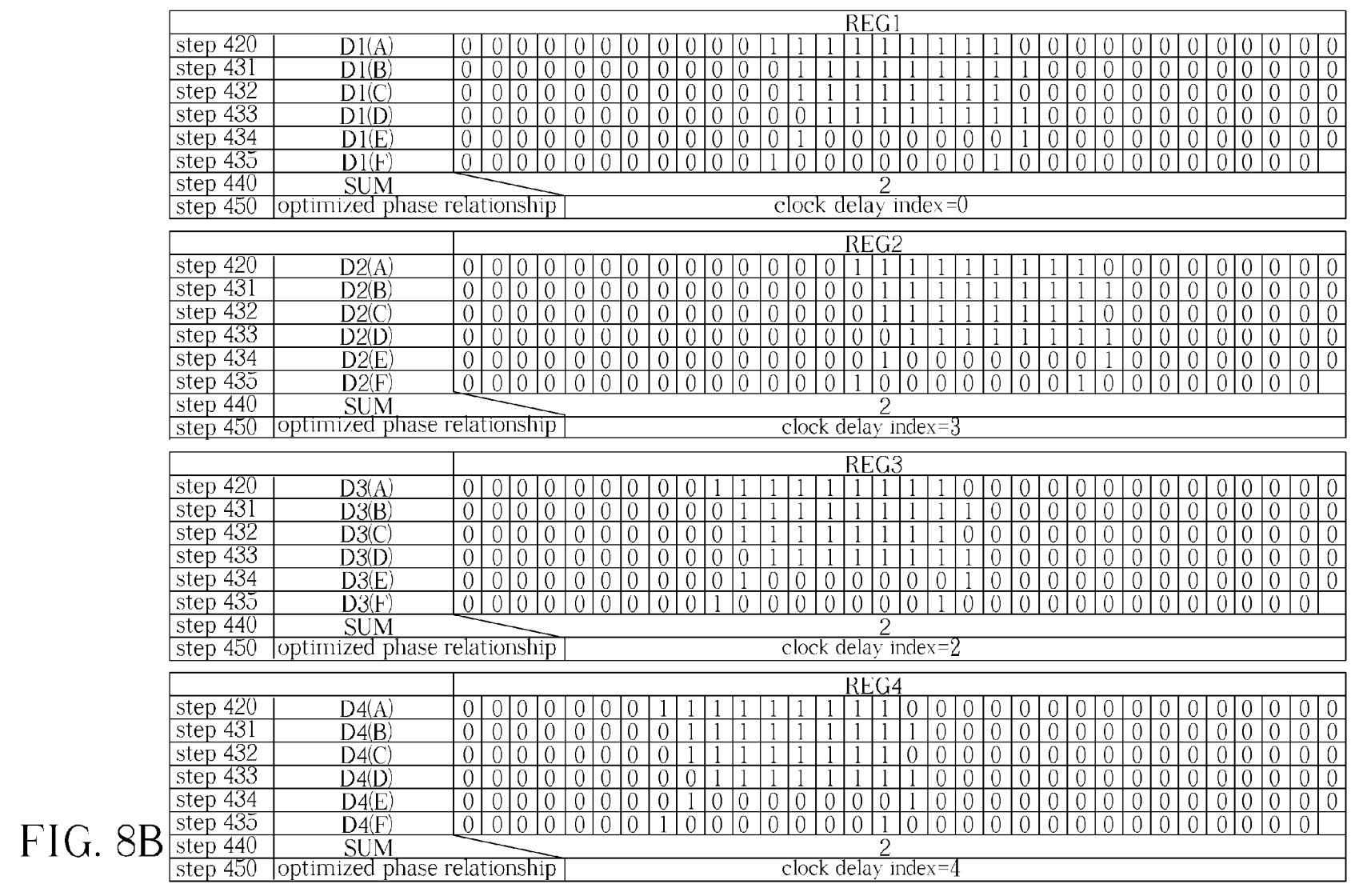
Figure 9B:
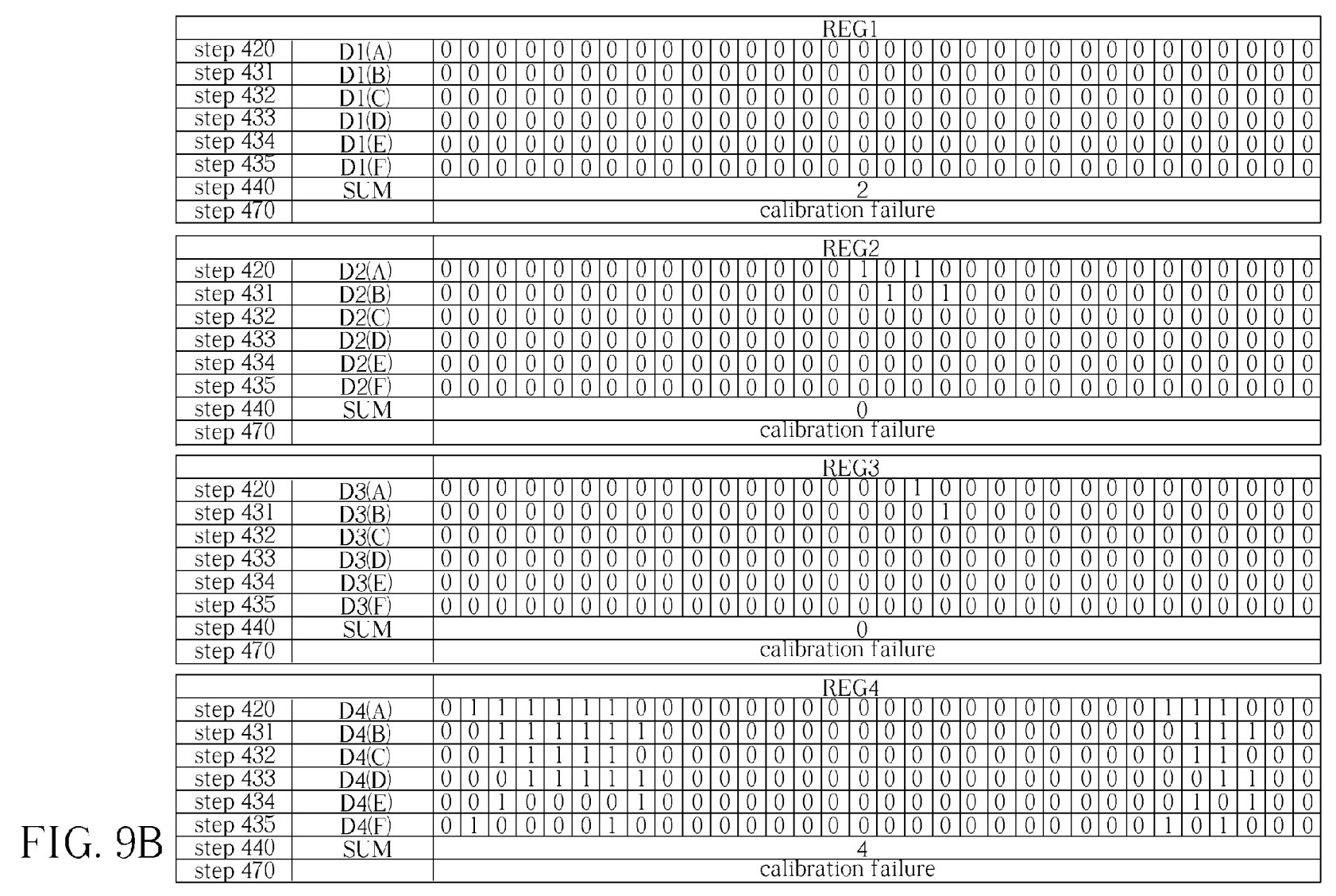

In FIGS. 8B and 9B, steps 431~439 illustrate the operation of the computing unit 340 when executing step 430.

Step 431: acquire data D1(B)~D4(B) by right-shifting data D1(A)~D4(A) stored in the registers REG1~REG4 by one bit.

Step 432: acquire data D1(C)~D4(C) by performing AND operation on data D1(A)~D4(A) and D1(B)~D4(B), respectively.

Step 433: acquire data D1(D)~D4(D) by right-shifting data D1(C)~D4(C) by one bit.

Step 434: acquire data D1(E)~D4(E) by performing XOR operation on data D1(C)~D4(C) and D1(D)~D4(D), respectively.

Step 435: acquire data D1(F)~D4(F) by left-shifting data D1(E)~D4(E) by one bit.

In step 440, the summation SUM may be acquired by summing all bits of data D1(F)~D4(F). If SUM is equal to 2, it is determined that calibration passes and step 450 is then executed for calculating corresponding centers of the "1" bits in data D1(F)~D4(F), thereby acquiring the optimized phase relationship of each channel, as depicted in FIGS. 8A~8B. If SUM is not equal to 2, it is determined that calibration fails and step 470 is then executed for notifying calibration failure, as depicted in FIGS. 9A~9B.

After acquiring the optimized phase relationship of each channel, step 460 may be executed for adjusting the phase of the clock signal or corresponding data signals according to the optimized phase relationship of each channel in normal mode.

For each transmission lane in MIDI, the present invention may process one or more data signals in various skew adjusting stages for acquiring a corresponding optimized phase relationship. Therefore, the phase of the clock signal or corresponding data signals may be adjusted according to the optimized phase relationship of each channel.

In conclusion, in non-ideal environment where multiple transmission lanes in MIDI may cause different amount of signal delays, the present invention may synchronize all signals for improving data accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for calibrating signal skew in an MIPI (mobile industry processor interface), comprising:
   transmitting a clock signal via a clock lane of the MIPI and transmitting a first data signal via a data lane of the MIPI in a calibration mode;
   providing $1^{st}$ to $N^{th}$ test clock signals by delaying the clock signal by 0 to (N−1) units of time, wherein N is an integer larger than 1;
   providing $1^{st}$ to $N^{th}$ first test data signals by delaying the first data signal by 0 to (N−1) units of time;
   acquiring 2N first latched data by latching the $1^{st}$ to $N^{th}$ first test data signals according to the $1^{st}$ test clock signal and by latching the $1^{st}$ first test data signal according to the $1^{st}$ to $N^{th}$ test clock signals, respectively;
   determining whether each first latched data matches first predetermined data associated with the first data signal;
   determining a first data pass zone which matches the first predetermined data;
   acquiring an optimized phase relationship between the clock lane and the data lane according to a center of the first data pass zone; and
   adjusting a signal delay of the clock lane and a signal delay of the data lane according to the optimized phase relationship when transmitting the clock signal and the first data signal in a normal mode.

2. A method for calibrating signal skew in an MIPI (mobile industry processor interface), comprising:
   transmitting a clock signal via a clock lane of the MIPI in a calibration mode;

transmitting a first data signal and a second data signal via a data lane of the MIPI in the calibration mode, wherein the first and second data signals have different values;

providing $1^{st}$ to $N^{th}$ test clock signals by delaying the clock signal by 0 to (N−1) units of time, wherein N is an integer larger than 1;

providing $1^{st}$ to $N^{th}$ first test data signals by delaying the first data signal by 0 to (N−1) units of time;

providing $1^{st}$ to $N^{th}$ second test data signals by delaying the second data signal by 0 to (N−1) units of time;

acquiring 2N first latched data by latching the $1^{st}$ to $N^{th}$ first test data signals according to the $1^{st}$ test clock signal and by latching the $1^{st}$ first test data signal according to the $1^{st}$ to $N^{th}$ test clock signals, respectively;

acquiring 2N second latched data by latching the $1^{st}$ to $N^{th}$ second test data signals according to the $1^{st}$ test clock signal and by latching the $1^{st}$ second test data signal according to the $1^{st}$ to $N^{th}$ test clock signals, respectively;

determining whether each first latched data matches first predetermined data associated with the first data signal;

determining whether each second latched data matches second predetermined data associated with the second data signal;

determining a first data pass zone which matches the first predetermined data;

determining a second data pass zone which matches the second predetermined data;

acquiring an optimized data pass zone of the data channel according to the first data pass zone and the second data pass zone;

acquiring an optimized phase relationship between the clock lane and the data lane according to a center of the optimized data pass zone; and adjusting a signal delay of the clock lane and a signal delay of the data lane according to the optimized phase relationship when transmitting the clock signal and the first data signal in a normal mode.

3. A transmission system using an MIPI (mobile industry processor interface), comprising:

a host side circuit configured to transmit a clock signal via a first lane of the MIPI and transmit a data signal via a second lane of the MIPI; and a client side circuit configured to adjust a signal delay of the first lane and a signal delay of the second lane according to an optimized phase relationship, comprising:

a receiving circuit configured to receive the clock signal and the data signal; and a calibration circuit configured to:

provide 1st to Nth test clock signals by delaying the clock signal by 0 to (N−1) units of time, wherein N is an integer larger than 1;

provide 1st to Nth test data signals by delaying the data signal by 0 to (N−1) units of time;

acquire 2N latched data by latching the 1st to Nth test data signals according to the 1st test clock signal and by latching the 1st test data signal according to the 1st to Nth test clock signals, respectively;

determine whether each latched data matches predetermined data associated with the data signal;

determine a data pass zone which matches the predetermined data; and acquire the optimized phase relationship between the first lane and the second lane according to a center of the data pass zone.

4. The transmission system of claim 3, wherein the calibration circuit comprises:

a delay unit configured to adjust the phase of the clock signal and the phase of the data signal;

a comparator configured to compare the latched data with the predetermined data associated with the data signal;

a storage unit configured to store a comparing result of the comparator;

a computing unit configured to acquire the optimized phase relationship according to the comparing result; and a controller configured to control the delay unit according to the optimized phase relationship for adjusting the signal delay of the first lane and the signal delay of the second lane.

\* \* \* \* \*